US009280800B2

(12) United States Patent
Darouich et al.

(10) Patent No.: US 9,280,800 B2
(45) Date of Patent: Mar. 8, 2016

(54) FLEXIBLE PIXEL-NEIGHBORHOOD-BASED RECONFIGURABLE COMPUTATION DEVICE

(75) Inventors: Mehdi Darouich, Fontenay aux Roses (FR); Stéphane Guyetant, Nantes (FR); Dominique Lavenier, Betton (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 1021 days.

(21) Appl. No.: 13/393,114

(22) PCT Filed: Aug. 3, 2010

(86) PCT No.: PCT/EP2010/061323
§ 371 (c)(1),
(2), (4) Date: Apr. 20, 2012

(87) PCT Pub. No.: WO2011/023502
PCT Pub. Date: Mar. 3, 2011

(65) Prior Publication Data
US 2012/0281930 A1    Nov. 8, 2012

(30) Foreign Application Priority Data

Aug. 28, 2009    (FR) ..................... 09 04105

(51) Int. Cl.
G06T 1/60    (2006.01)
G06T 1/20    (2006.01)
(52) U.S. Cl.
CPC ......... *G06T 1/20* (2013.01); *G06T 2207/10012* (2013.01)

(58) Field of Classification Search
CPC ..... G06T 1/00; G06T 2200/28; G06T 7/0081; H04N 2013/0081; G06F 17/30247
See application file for complete search history.

(56) References Cited

U.S. PATENT DOCUMENTS

2006/0013473 A1*    1/2006    Woodfill et al. .............. 382/154

OTHER PUBLICATIONS

A. Fusiello et al.: "Symmetric Stereo With Multiple Windowing," International Journal of Pattern Recognition and Artificial Intelligence, vol. 14, No. 8 (2000), pp. 1053-1066.
R.P. Jacobi et al.: "VoC: A Reconfigurable Matrix for Stereo Vision Processing," Parallel and Distributed Processing Symposium, 2006. IPDPS 2006. 20th International Rhodes Island, Greece April 25-29, 2006, Piscataway, NJ, USA, IEEE, Apr. 25, 2006, pp. 1-6.
M. Darouich et al.: "Architecture flexible pour la stereovision embarquee," Oct. 10, 2008.

(Continued)

*Primary Examiner* — Hau Nguyen
(74) *Attorney, Agent, or Firm* — Baker & Hostetler LLP

(57) ABSTRACT

A reconfigurable computation device for image processing, the device including a neighborhood-based computation matrix, generating pairing sub-scores between pairs of pixels resulting from a first series of operations configurable via a configuration register; a flexible reduction tree, carrying out a second series of operations configurable via the configuration register, on neighborhoods of pixels configurable via the configuration register; and an analysis matrix, carrying out computations configurable via the configuration register on the results arising from the flexible reduction tree.

27 Claims, 8 Drawing Sheets

(56) References Cited

OTHER PUBLICATIONS

S. Lee et al.: "Real-Time Stereo Vision on a Reconfigurable System," Jul. 1, 2005, Embedded Computer Systems: Architectures, Modeling, and Simulation; pp. 299-307.

C. Cuadrado et al.: "Real-Time Stereo Vision Processing Systems in a FPGA," IEEE Industrial Electronics, IECON 2006—32nd Annual Conference on, IEEE, Piscataway, NJ, USA, Nov. 1, 2006, pp. 3455-3460.

* cited by examiner

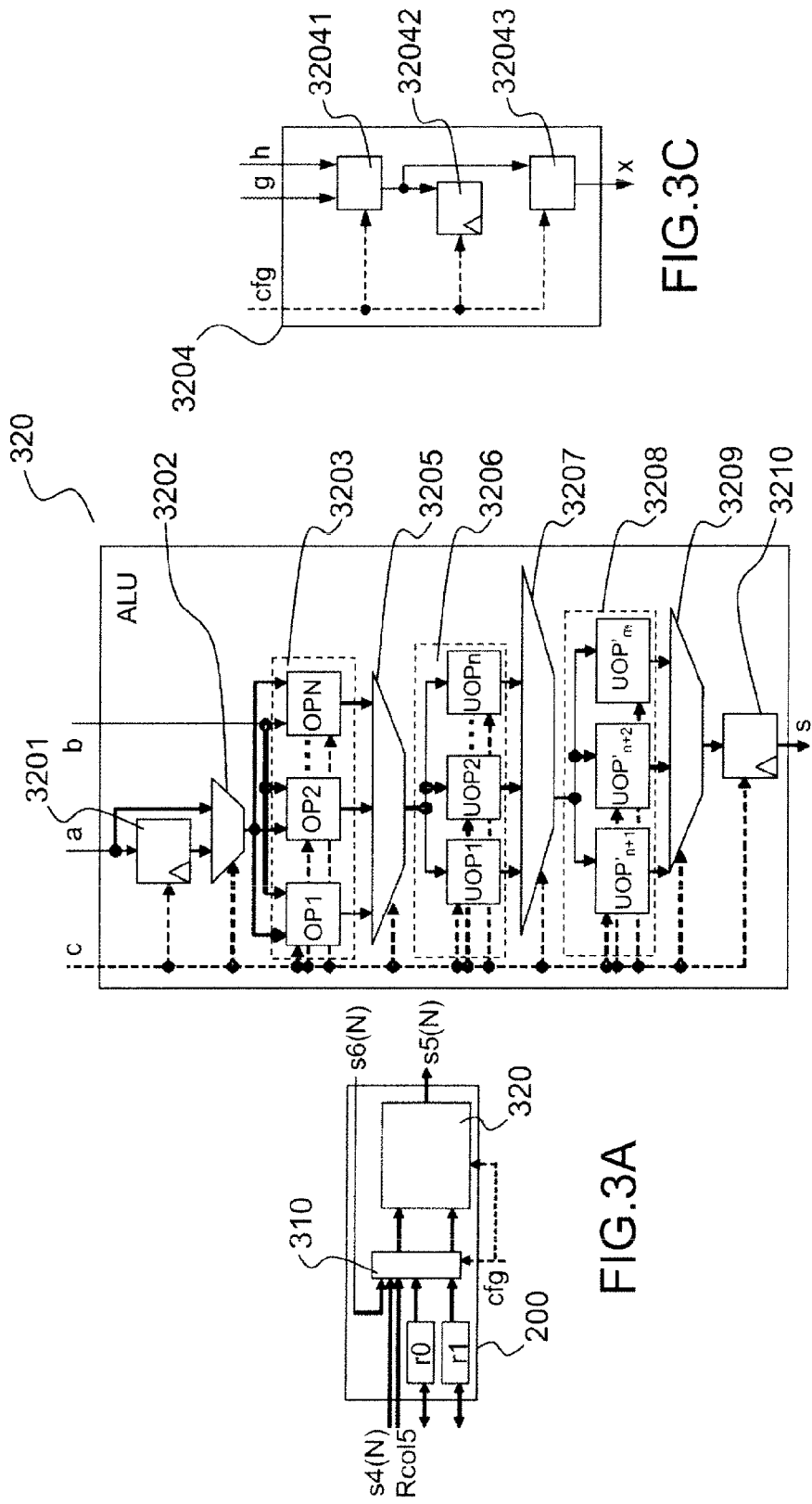

FLEXIBLE PIXEL-NEIGHBORHOOD-BASED RECONFIGURABLE COMPUTATION DEVICE

CROSS-REFERENCE TO RELATED APPLICATIONS

This application is a National Stage of International patent application PCT/EP2010/061323, filed on Aug. 3, 2010, which claims priority to foreign French patent application No. FR 09 04105, filed on Aug. 28, 2009, the disclosures of each of which are incorporated by reference in their entireties.

FIELD OF THE DISCLOSED SUBJECT MATTER

The present invention relates to a pixel-neighborhood-based reconfigurable computation device. It applies notably to the field of image processing, and more particularly to the field of onboard hardware solutions for image processing.

BACKGROUND

There exists an ever-growing number of systems requiring onboard solutions for image processing. For example, onboard stereovision solutions are required in industrial or domestic robots, in devices for aiding driving or indeed automated driving of vehicles such as drones or automobiles, in devices of vision prosthesis type, or indeed in commonly used devices such as portable telephones. Stereovision consists of the estimation of the depth of the points forming a scene, which is customarily transcribed via two images captured by two sensors disposed in an appropriate manner relative to one another, and forming a stereoscopic pair. There exists a plurality of stereovision algorithms, most being based on the intensity of the pixels constituting the images to be processed. All these algorithms are based on the matching of pixel neighborhoods, with the aim of determining the disparity of the pixels constituting one image relative to the pixels of the other image. For a given reference image, the set of disparities is thus determined by pairing each of the pixels of which it consists with the pixels of the second image; this results in an image customarily designated a "disparity map".

Thus, a first step of the matching of pixel neighborhoods customarily consists in determining pairing scores, representative of the degree of similarity between pixels. A second step then consists in analyzing the pairing scores with the aim of choosing the pair of pixels affording the right disparity, possibly based on local, semi-global information, for example on a line of the image, or on global information, that is to say on the entirety of the image, and possibly being associated with a filtering aimed at eliminating erroneous disparities.

Among the algorithms, sometimes designated "metrics", known from the prior art, may be cited:
- the sum of the absolute discrepancies, commonly designated by the acronym "SAD", from the expression "Sum of Absolute Differences". This metric is the simplest to implement, and so is one of the most widely used; it is based on the computation of pairing scores as a function of the sum of the absolute differences between the intensities of the pixels,
- the sum of the discrepancies squared, commonly designated by the initials "SSD", from the expression "Sum of Squared Differences". This metric is close to the aforementioned SAD metric, but is based, rather than on absolute values of differences, on squares of the values of differences. The effect of the SSD metric is to increase the discrepancies, but also to increase the dynamic range of the pairing scores. On the other hand, it exhibits the drawback of greater complexity of the computations to be implemented,
- the Normalized Cross Correlation, commonly designated by the initials "NCC". The advantage of this metric is that it is insensitive to differences in gain between the processed images, in contradistinction to the two aforementioned metrics SAD and SSD. The drawback of the NCC is that it requires complex computations, resorting to multiplication, square root and division operations, and furthermore exhibits, in the manner of the SAD and SSD metrics, sensitivity to the biases between the images to be processed,
- the metrics designated by the initials ZSAD, ZSSD and ZNCC, respectively derived from the aforementioned metrics SAD, SSD and NCC. These metrics have the advantage of insensitivity to differences in gain as far as the ZSAD and ZSSD metrics are concerned, and of insensitivity to differences in gain and to biases, as far as ZNCC is concerned. However, these metrics exhibit the drawback of necessitating computational resources that are substantially more constraining,
- the metric designated by the term "Census". The Census scheme is a scheme for computing pairing scores consisting firstly in creating a census vector whose components result from the comparison between each neighborhood pixel and the central pixel of the neighborhood window, and secondly, in generating the pairing score by computing the Hamming distance between the census vectors of each neighborhood window. This metric exhibits the drawback of being very expensive in terms of computational resources.

The various existing algorithms for matching neighborhoods of pixels are more or less well suited to particular applications. Indeed, one and the same application may require recourse to various algorithms to produce effective results in various situations. For example, within the framework of a stereovision application in a motor vehicle, a given algorithm may be more or less suited depending on whether the vehicle is travelling on a motorway or whether it is travelling in an urban zone; or else, if the vehicle is travelling at night or by day, in a zone of light or heavy traffic, etc. Also, certain applications or certain configurations within the framework of one and the same application may require that filters are for example applied to the images, before the matching.

Hardware solutions implementing existing algorithms are known from the prior art. Most hardware solutions are dedicated, and implement a given algorithmic chain as a function of the constraints to which they are tied, imposed by the application. The pairing scores may be computed according to a fixed metric, on one or more fixed neighborhoods, and the choice of the disparity may be performed according to a scheme which may or may not be followed by error filtering. A drawback of the existing hardware solutions is that they offer limited flexibility, or indeed none, as regards the metric used, and/or the nature and the dimensions of the neighborhood taken into account in the algorithms. It may be desirable, in certain applications, to have an architecture allowing greater flexibility, and possibilities of reconfiguration, by an operator or else in an automatic manner, of the metric used and of the neighborhood.

There exist hardware solutions allowing some flexibility, but the latter is obtained at the price of overdimensioned hardware architectures, using refined computation means relying on powerful microprocessors and voluminous memories. Such architectures are then customarily under-utilized within the framework of specific applications, and are not compatible with onboard applications requiring hardware architectures of small dimensions and of sparing consumption during use.

SUMMARY

An aim of the present invention is to alleviate the aforementioned drawbacks, by proposing a device whose hardware architecture allows great flexibility, while adhering to the low-consumption and computation-speed constraints related to real-time onboard applications.

An advantage of the invention is that it also allows the implementation of a large number of existing image processing algorithms, on the basis of a single hardware structure. It is thus possible to reduce manufacturing costs, by intending one and the same architecture for a great diversity of applications.

For this purpose, the subject of the invention is a reconfigurable computation device for image processing, characterized in that it comprises:
- at least one neighborhood-based computation matrix, generating pairing sub-scores between pairs of pixels resulting from a first series of operations configurable via data contained in a configuration register,
- at least one flexible reduction tree, carrying out on the sub-scores a second series of operations configurable via the configuration register, on neighborhoods of pixels configurable via the configuration register,
- at least one analysis matrix, carrying out computations of scores configurable via the configuration register on the results arising from the flexible reduction tree.

In one embodiment of the invention, the reconfigurable computation device is characterized in that the neighborhood-based computation matrix communicates with at least two memories, a first memory containing the information relating to pixels of a first image $I_1$ and a second memory containing the information relating to pixels of a second image $I_2$.

In one embodiment of the invention, the reconfigurable computation device is characterized in that it comprises a third memory able to store information common to a plurality of pixels of one of the images and communicating with the neighborhood-based computation matrix.

In one embodiment of the invention, the reconfigurable computation device is characterized in that a fourth memory is able to store intermediate data utilized by the analysis matrix.

In one embodiment of the invention, the reconfigurable computation device is characterized in that the output data of the analysis matrix are able to be communicated to an external device via a data bus.

In one embodiment of the invention, the reconfigurable computation device is characterized in that the output data of the analysis matrix are able to be reintroduced as input to the analysis matrix.

In one embodiment of the invention, the reconfigurable computation device is characterized in that the neighborhood-based computation matrix comprises a plurality M of columns, each column comprising a plurality N of neighborhood-based computation elements, each neighborhood-based computation element performing on the information relating to a pair of pixels arising from the two respective images $I_1$, $I_2$, operations configurable via the configuration register producing a pairing sub-score.

In one embodiment of the invention, the reconfigurable computation device is characterized in that each neighborhood-based computation element comprises two data registers r0, r1 storing the intermediate data undergoing processing.

In one embodiment of the invention, the reconfigurable computation device is characterized in that each neighborhood-based computation element comprises an arithmetic and logic unit with two inputs determined by a selection logic block selecting via the configuration register two data from among the data contained in the two data registers r0, r1, the value resulting from the computations effected at the previous clock cycle by the neighborhood-based computation element of like rank of the following column, and the value resulting from the computations effected at the previous clock cycle by the neighborhood-based computation element of like rank of the previous column.

In one embodiment of the invention, the reconfigurable computation device is characterized in that at each clock cycle, the data included in the first data register r0 and the second data register r1 of a neighborhood-based computation element of a given column, can move respectively into the first data register r0 and the second data register r1 of the neighborhood-based computation element of the same given rank, into a column preceding or following the said given column by a first integer spacing configurable via the configuration register of a determined maximum value or into the first data register r0 and the second data register r1 of the neighborhood-based computation element of higher or lower rank than the said given rank by a second integer spacing configurable via the configuration register of a determined maximum value.

In one embodiment of the invention, the reconfigurable computation device is characterized in that each column is associated with a column register $R_{coln}$ containing data common to all the neighborhood-based computation elements of the column.

In one embodiment of the invention, the reconfigurable computation device is characterized in that the selection logic block is furthermore able to select the datum included in the column register $R_{coln}$.

In one embodiment of the invention, the reconfigurable computation device is characterized in that the arithmetic and logic unit comprises at least one first level of arithmetic operators with two inputs and an output, a second level of operators with an input and an output and a third level of operators with an input and an output, the data applied to the inputs of the operators included in the second and third levels being selected by multiplexers from among the outputs respectively of the operators of the first level and second level via the configuration register, the data applied to the two inputs of the operators of the said first level being the two input data a, b of the logic and arithmetic unit.

In one embodiment of the invention, the reconfigurable computation device is characterized in that each of the arithmetic operators of the said first level of operators is a multiplier, an adder, a subtracter and/or a divider.

In one embodiment of the invention, the reconfigurable computation device is characterized in that each of the arithmetic operators of the said first level of operators is a multiplier, an adder, a subtracter, a divider and/or a census operator comprising a comparison operator comparing the two inputs of the operator, whose Boolean output drives a census register, the census register and the output of the comparison operator driving the inputs of a census logical computation operator, the configurations of the census register, of the comparison operator and of the census logical computation operator being specified by a configuration word contained in the configuration register.

In one embodiment of the invention, the reconfigurable computation device is characterized in that the arithmetic and logic unit furthermore comprises a first register able to store the value of the first input a at a given clock cycle, a first multiplexer allowing the selection of the first input or of the value stored in the first register so as to drive an input of each of the arithmetic operators of the said first level of operators.

In one embodiment of the invention, the reconfigurable computation device is characterized in that the arithmetic and logic unit furthermore comprises a second register at the output of the neighborhood-based computation element able to validate or invalidate the result obtained at a given clock cycle, as a function of a configuration bit present in the configuration register.

In one embodiment of the invention, the reconfigurable computation device is characterized in that the flexible reduction tree comprises a first stage of flexible reduction networks and a second stage of flexible reduction networks, the first stage comprising M flexible reduction networks with N inputs and a number K of outputs and the second stage comprising K flexible reduction networks with M inputs and a number F of outputs, K corresponding to the maximum number of simultaneous windows on a column and F to the maximum number of simultaneous windows on a line.

In one embodiment of the invention, each flexible reduction network comprises a plurality of stages of adder blocks, the inputs of the adder blocks of the first stage being the inputs of the flexible reduction network, and the inputs of the adder blocks of a next stage being driven by the outputs of the adder blocks of the previous stage.

In one embodiment of the invention, the number of stages of adder blocks is equal to three, and each adder block possesses three inputs.

In one embodiment of the invention, inputs of the adder blocks may be disabled, the selection of the disabled inputs being carried out via the configuration register.

In one embodiment of the invention, the reconfigurable computation device is characterized in that the analysis matrix comprises a plurality L of columns, each column comprising a plurality W of configurable computation modules with two inputs c, d and two outputs e, f able to carry out arithmetical and/or combinatorial operations specified via the configuration register, the inputs of the configurable computation modules of the first column being driven by the outputs of the flexible reduction tree after redirection via a flexible interconnection network disposed upstream of the first column, the redirection being specified via the configuration register, and the results arising from the operations carried out by the configurable computation modules of a given column being applied to the inputs of the configurable computation modules of the next column, after redirection via a flexible interconnection network disposed upstream of the first column, the redirection being specified via the configuration register.

In one embodiment of the invention, each configurable computation module comprises at least one computation operator with two inputs and an output, configurable via the configuration register, a third register storing a determined value specified via the configuration register, a loopback register able to reinject a result arising from the computation operator at one of its inputs, a fourth register and a fifth register which are able to validate or invalidate the results generated by the reconfigurable computation module as a function of the input values c, d, output values of the computation operator and/or of the configuration register.

In one embodiment of the invention, the computation operator receives at its first input a value chosen by a fifth multiplexer via the configuration register between the first input value c of the configurable computation module and the value stored in the loopback register, and at its second input a value chosen by a sixth multiplexer via the configuration register between the second input value d of the configurable computation module and the value stored in the third register.

In one embodiment of the invention, a seventh multiplexer allows the selection of the inputs of the fourth and fifth registers via the configuration register, from among the output of the said fifth multiplexer, of the said sixth multiplexer and of the output of the said computation operator.

In one embodiment of the invention, each configurable computation module furthermore comprises a configuration logic block generating in place of the configuration register, the logical configuration words for the elements constituting the configurable computation module, on the basis of the configuration register, of the two input values c and d of the configurable computation module and of the output value of the computation operator.

The subject of the invention is also an integrated circuit implementing a reconfigurable computation device according to one of the embodiments described.

The subject of the invention is also an integrated circuit implementing a plurality of reconfigurable computation devices according to one of the embodiments described, mounted in parallel.

BRIEF DESCRIPTION OF THE DRAWINGS

Other characteristics and advantages of the invention will become apparent on reading the description, given by way of example, offered with regard to the appended drawings which represent:

FIGS. 3a, 3b and 3c, respectively a diagram illustrating the architecture of a neighborhood-based computation element of the neighborhood-based computation matrix, a diagram illustrating an arithmetic and logic unit constituting a subset of the neighborhood-based computation element, and a diagram illustrating an operator integrated into the said arithmetic and logic unit;

DETAILED DESCRIPTION

Figure 1:
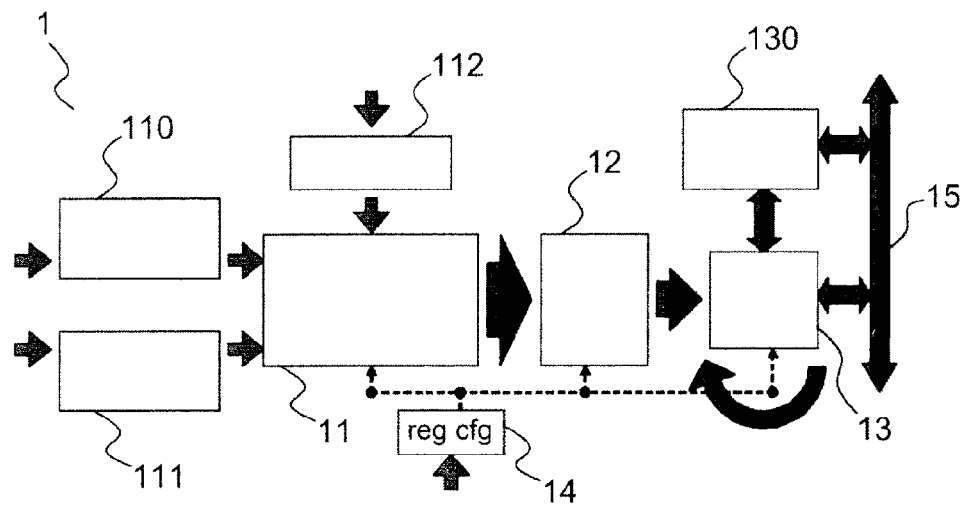
FIG. 1, as a schematic, a diagram illustrating the general architecture of a computation device according to an exemplary embodiment of the invention.

FIG. 1 presents, as a schematic, a diagram illustrating the general architecture of a computation device according to an exemplary embodiment of the invention.

A computation device 1 can comprise a neighborhood-based computation matrix 11 communicating with a first memory 110, a second memory 111 and advantageously a third memory 112. The neighborhood-based computation matrix 11 outputs data to a flexible reduction tree 12. The output data of the flexible reduction tree 12 are provided to an analysis matrix 13, which is able to communicate with a fourth memory 130. A configuration register 14 may be consulted by the neighborhood-based computation matrix 11, the flexible reduction tree 12 and the analysis matrix 13. The memories 110, 111, 112, 130 can exchange data via a data bus 15, which is also able to exchange data with the analysis matrix 13. The memories 110, 111, 112 supplying the neighborhood-based computation matrix 11 can contain the data to be processed, for example the data relating to the pixels of images to be processed. Notably, the first memory 110 may contain the data relating to a first image $I_1$, and the second memory 111, the data relating to a second image $I_2$. The third memory 112 may for example be used for the storage of information common to the pixels of a neighborhood, for example the information relating to notable pixels of a neighborhood for the application of specific metrics. The fourth memory 130 may for example be used for the storage of intermediate data utilized within the framework of the analysis performed by the analysis matrix 13.

The memories 110, 111 may contain the entirety of the pixels of the images $I_1$ and $I_2$; however, they may also contain only part of the pixels of the images $I_1$ and $I_2$, and be loaded successively with various parts, so as to cover the entirety of the pixels; thus the area for implementing the device on a silicon chip may advantageously be reduced.

The data provided at the output of the neighborhood-based computation matrix 11 are pairing sub-scores related to pairs of pixels of the two images to be analyzed. The flexible reduction tree 12 combines these sub-scores so as to define the neighborhoods of pixels useful to the analysis. The analysis matrix 13 utilizes the output data of the flexible reduction tree 12 and applies appropriate processing operations to them, for example sort operations, as a function of the schemes employed. The output data of the analysis matrix 13 can then be communicated by the data bus 15, so as to be utilized by a higher-level system. Advantageously, the output data of the analysis matrix 13 can also be reintroduced as input to the latter.

Figure 2:
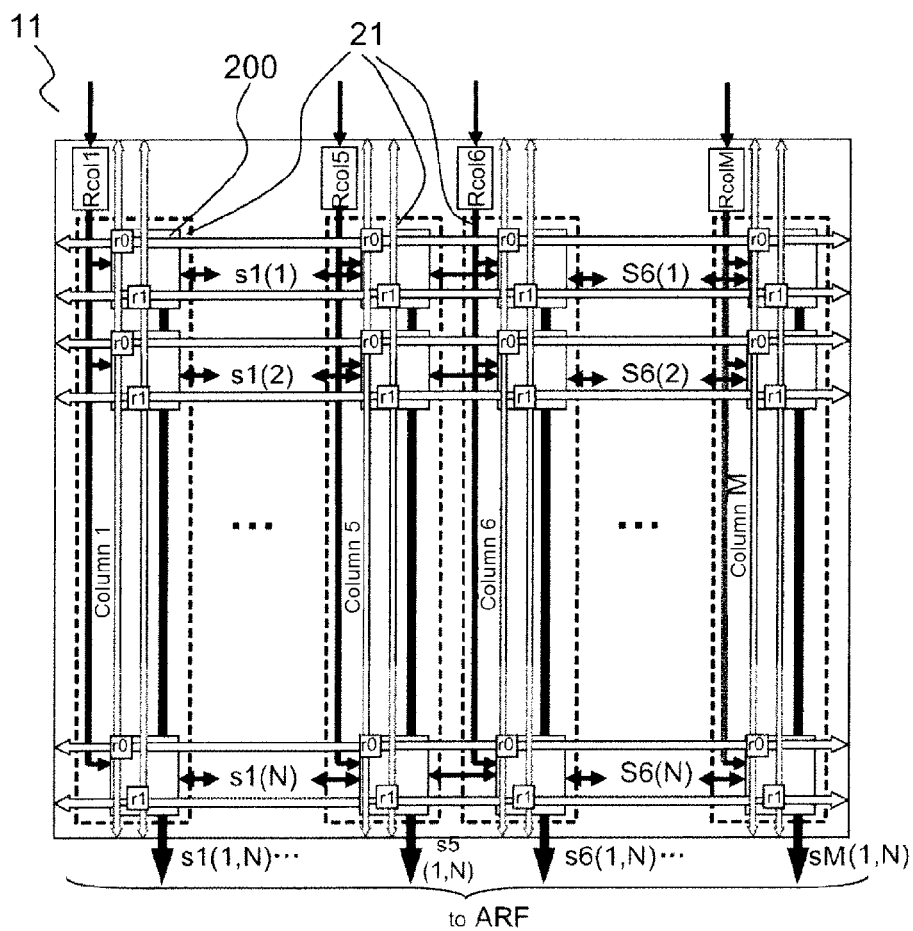
FIG. 2, a diagram illustrating the architecture of a neighborhood-based computation matrix, in a computation device according to an exemplary embodiment of the invention.

FIG. 2 presents a diagram illustrating the architecture of the neighborhood-based computation matrix 11, in a computation device according to an exemplary embodiment of the invention.

The neighborhood-based computation matrix 11 can comprise M columns 21, each comprising N neighborhood-based computation elements 200, that is to say the total number of neighborhood-based computation elements 200 is equal to N×M. A detailed description of a neighborhood-based computation element 200 is provided hereinafter with reference to FIGS. 3a and 3b. Each column n 21 may be associated with a column register $Rcol_n$. The column register $Rcol_n$ may be supplied by memories or an external device. With each neighborhood-based computation element 200 are associated two data registers r0 and r1, allowing notably the storage of the data undergoing processing. Advantageously, at each clock cycle, the data can move laterally within the neighborhood-based computation matrix 11, in both directions, by a configurable spacing, of a value of 1 to k, k being an integer number. Thus, for example, for the fourth neighborhood-based computation element of the fifth column 21 of the neighborhood-based computation matrix 11, the data included in the data registers r0 and r1 can move into the data registers r0 and r1 respectively, of the fourth neighborhood-based computation elements 200 of columns 5−k to 5+k.

Advantageously, at each clock cycle, the data can move vertically within a given column of the neighborhood-based computation matrix 11, in both directions, by a configurable integer spacing.

Advantageously also, the immediately neighboring neighborhood-based computation elements 200 may be placed in series so as to combine operations. Thus, the fifth neighborhood-based computation element 200 of the fifth column 21 can receive the result computed by the fifth neighborhood-based computation element 200 of the fourth column or else the fifth neighborhood-based computation element 200 of the sixth column, as is explained in greater detail hereinafter with reference to FIGS. 3a and 3b.

FIGS. 3a, 3b and 3c respectively present a diagram illustrating the architecture of a neighborhood-based computation element 200 of the neighborhood-based computation matrix 11, a diagram illustrating an arithmetic and logic unit constituting a subset of the neighborhood-based computation element 200, and a diagram illustrating an example of a census operator CENSUS used in the arithmetic and logic unit.

With reference to FIG. 3a, the neighborhood-based computation element 200 can comprise, in addition to the two data registers r0 and r1, a selection logic block 310, linked to the two data registers r0 and r1, and to a logic and arithmetic unit, designated hereinafter by the commonly used acronym ALU 320, and an exemplary architecture of which is described in detail with reference to FIG. 3b. By way of example, the neighborhood-based computation element 200 illustrated by FIG. 3a is that of the fifth column of the neighborhood-based computation matrix, and of the Nth rank in the column. The selection logic block 310 makes it possible to select two values, from among the values stated hereinafter:

the value contained in the first data register r0,
the value contained in the second data register r1,
the value contained in the register of the column (column 5 in the example illustrated by the figure), that is to say the value $Rcol_5$,
the value retrieved by the neighborhood-based computation element of the previous column, and of the same rank as the neighborhood-based computation element 200 represented, that is to say the value s4(N),
the value retrieved by the neighborhood-based computation element of the following column, and of the same rank as the neighborhood-based computation element 200 represented, that is to say the value s6(N).

The two values selected by the selection logic block 310 are introduced into the inputs a and b of the ALU 320. The selection is specified by a configuration word arising from the configuration register 14, with reference to FIG. 1. The ALU 320 performs operations on the input values a and b, the selection of the operations performed is specified by a configuration word also arising from the configuration register 14. The result of the operations carried out s5(N) is retrieved at the output of the ALU 320, i.e. at the output of the neighborhood-based computation element 200.

With reference to FIG. 3b, the ALU 320 can comprise a plurality of operators. In the exemplary embodiment represented, the first input a can drive a first register 3201. The first register 3201 and the first input a can drive a first multiplexer 3202. The output of the first multiplexer 3202 can drive an input of each of a plurality N of arithmetic operators OP 1 to OP N with two inputs. The arithmetic operators OP 1 to OP N form a first level of operators 3203. The arithmetic operators OP 1 to OP N can for example be multiplication, division, addition or subtraction operators, but also other arithmetic operators. For example, one of the operators OP 1 to OP N may be a CENSUS census operator 3204, described in detail hereinafter with reference to FIG. 3c. An input of each of the operators OP 1 to OP N can also be loaded with the value of the second input b. The outputs of the operators OP 1 to OP N drive a second multiplexer 3205. The output of the second multiplexer 3205 drives the inputs of a plurality n of unitary operators UOP 1 to UOP n. The unitary operators UOP 1 to UOP n form a second level of operators 3206. A third multiplexer 3207 is driven by the outputs of the unitary operators UOP 1 to UOP n. The output of the third multiplexer 3207 drives the inputs of a plurality of unitary operators UOP' n+1 to UOP' m. The unitary operators UOP' n+1 to UOP' m form a third level of operators 3208. The outputs of the unitary operators UOP' n+1 to UOP' m drive a fourth multiplexer 3209. The output of the fourth multiplexer 3209 loads a second register 3210, retrieving the output value of the neighborhood-based computation element integrating the ALU 320.

With reference to FIG. 3c, a CENSUS census operator 3204 with two inputs g and h and with an output x can comprise a comparison operator 32041, a CENSUS register 32042 and a CENSUS logical computation operator 32043. In the exemplary embodiment illustrated by the figure, the inputs g and h can drive the inputs of the comparison operator 32041. The output, coded on 1 bit, of the comparison operator 32041 can drive the CENSUS census register 32042. The CENSUS census register 32042 and the output of the comparison operator 32041 can drive the inputs of the CENSUS census logical computation operator 32043. The configurations of the CENSUS census register 32042, of the comparison operator 32041 and of the CENSUS census logical computation operator 32043 are specified by a configuration word contained in the configuration register 14, with reference to FIG. 1.

Figure 4A:
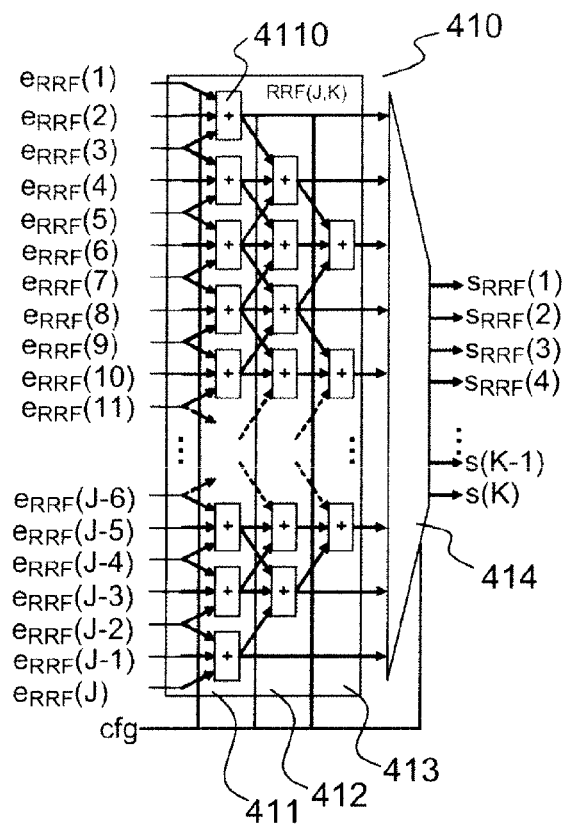
FIGS. 4a and 4b, respectively a diagram illustrating the architecture of a flexible reduction network and the architecture of a flexible reduction tree formed by a plurality of flexible reduction networks, according to an exemplary embodiment of the invention.
Figure 4B:
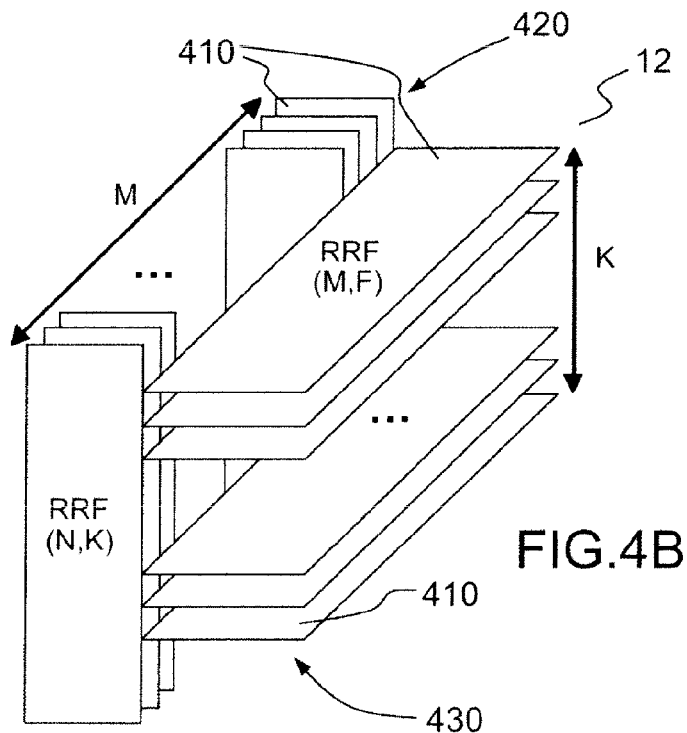

FIGS. 4a and 4b respectively present a diagram illustrating the architecture of a flexible reduction network and the architecture of a flexible reduction tree formed by a plurality of flexible reduction networks, according to an exemplary embodiment of the invention.

With reference to FIG. 4a, a flexible reduction network 410 comprising J inputs $e_{RRF}(1)$ to $e_{RRF}(J)$ and K outputs $s_{RRF}(1)$ to $s_{RRF}(K)$, hereinafter designated RRF(J,K) 410, can comprise three stages 411, 412, 413 of adder blocks with three inputs 4110. The first stage 411 comprises (J−1)/2 adders 4110. The first three inputs $e_{RRF}(1)$ to $e_{RRF}(3)$ drive a first adder block 4110, the third input $e_{RRF}(3)$ also drives a second adder block 4110, as well as the fourth and fifth inputs $e_{RRF}(4)$ and $e_{RRF}(5)$, and so on and so forth, a penultimate adder block 4110 being driven by the inputs $e_{RRF}(J−4)$ to $e_{RRF}(J−2)$, and a last adder block 4110 being driven by the inputs $e_{RRF}(J−2)$ to $e_{RRF}(J)$. Stated otherwise, two neighboring adder blocks of the first stage 411 have an input in common. The second stage 412 comprises a plurality of adders with three inputs, these latter being driven in a similar manner, by the outputs of the adders of the first stage 411. Stated otherwise, two neighboring adder blocks of the second stage 412 have two inputs which intersect. Also, the third stage 413 comprises a plurality of adders with three inputs, these latter being driven by the outputs of the adders of the second stage 412. The outputs of the adders of the third stage 413, the outputs of the first and ultimate adders of the first stage 411, as well as the outputs of the adder blocks 4110 of odd rank (the first, the third, the fifth, etc.) of the second stage 411, drive a multiplexer RRF 414.

Each of the inputs of each adder 4110 of each of the three stages 410, 411, 412, may be invalidated, that is to say set to zero, by a configuration signal arising from the configuration register 14. The multiplexer RRF 414 allows the selection of one of the K outputs of the RRF, this selection being specified by a configuration signal arising from the configuration register 14.

The flexible reduction network 410 constitutes the base of the flexible reduction tree 12, with reference to FIG. 1. FIG. 4b illustrates an exemplary architecture of the flexible reduction tree 12. With reference to FIG. 4b, the flexible reduction tree can comprise a first layer of RRFs 420 comprising a plurality M of RRFs 410 with N inputs and K outputs, such as illustrated by FIG. 4a. Each output $s_{RRF}(k)$ of one of the M RRFs 410 of the first layer of RRFs 420 is linked to an input of an RRF 410 of a second layer of RRFs 430 comprising a plurality K of RRFs 410 with M inputs, and a number F of outputs. Thus, the total number of inputs of the flexible reduction tree 12 is the total number of inputs of the M RRFs 410 of the first layer of RRFs 420, i.e. N×M, and the total number of outputs of the flexible reduction tree 12 is the total number of outputs of the K RRFs 410 of the second layer of RRFs 430, i.e. K×F outputs. The number K corresponds to the maximum number of simultaneous windows on a column, and the number F corresponds to the maximum number of simultaneous windows on a line.

It is advantageously possible to integrate a plurality of computation devices 1 such as illustrated by FIG. 1, for example into a single electronic chip. Such a structure can for example allow the simultaneous processing of several lines of the images.

Advantageously, such a structure may be embodied in an optimized manner, according to the architecture illustrated in detail by FIG. 5 described hereinafter, comprising a plurality H of neighborhood-based computation matrices 11, each comprising M columns of N neighborhood-based computation elements 200, with reference to FIG. 2 hereinabove.

Figure 5:
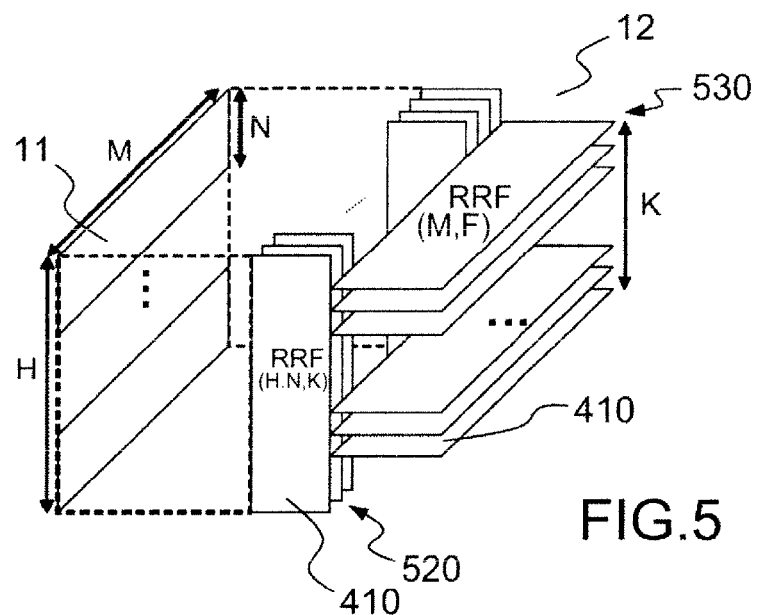
FIG. 5, a diagram illustrating a flexible reduction tree whose inputs are linked to a plurality of neighborhood-based computation matrices, in an exemplary embodiment of the invention.

FIG. 5 presents a diagram illustrating a flexible reduction tree whose inputs are linked to a plurality H of neighborhood-based computation matrices 11, in an exemplary embodiment of the invention.

In the example illustrated by FIG. 5, it is possible to interface H neighborhood-based computation matrices 11 of size N×M, with one and the same flexible reduction tree 12 comprising a first layer of RRFs 520 of a plurality M of RRFs 410 with H×N inputs and K outputs, the outputs of the M RRFs 410 of the first layer of RRFs 520 driving the inputs of K RRFs 410 with M inputs and F outputs, forming a second layer of RRFs 530. The total number of inputs of the flexible reduction tree 12 is thus H×N×M, and this results at the output of the flexible reduction tree 12, in a matrix comprising columns subdivided into sections of size N, each possessing an independent column register. Such a structure may be particularly advantageous, for example for the simultaneous computation of several pairing scores according to the Census scheme, on independent neighborhood windows.

The scores arising from the flexible reduction tree 12 can then undergo a subsequent processing, implemented by the analysis matrix 13, with reference to FIG. 1 hereinabove, and described in detail hereinafter with reference to FIG. 6.

Figure 6:
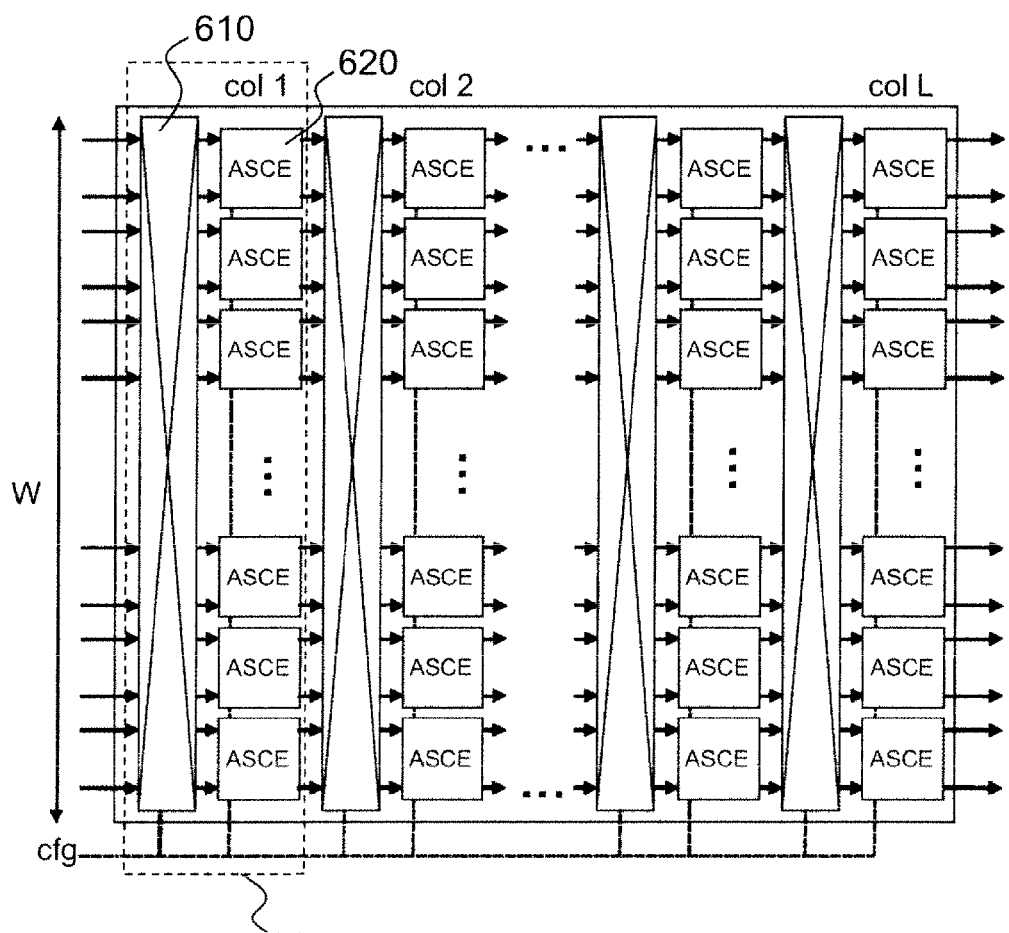
FIG. 6, a diagram illustrating the architecture of an analysis matrix, in an exemplary embodiment of the invention.

FIG. 6 presents a diagram illustrating the architecture of an analysis matrix, in an exemplary embodiment of the invention.

In the example illustrated by FIG. 6, the analysis matrix 13 comprises a plurality L of columns 600, each column comprising a plurality W of configurable computation modules 620, hereinafter dubbed "ASCEs", according to the initials designating the terms "Add-Subtract-Compare-Exchange". A detailed structure of an ASCE 620 is described hereinafter with reference to FIG. 7. Each ASCE 620 comprises two inputs, and can carry out one or more operation(s) specified by a configuration word arising from the configuration register 14. Each ASCE 620 also possesses two outputs. An input of an ASCE 620 may be connected to one of the outputs of the ASCEs of the previous column, via a flexible interconnection network 610 disposed upstream in each of the columns 600. The interconnection carried out by each flexible interconnection network 610 is specified by a configuration word arising from the configuration register 14. The connectivity may be total, that is to say each input of an ASCE 620 may be connected to all the outputs of the ASCEs of the previous column 600. In an alternative embodiment, the connectivity may be partial, that is to say each input of an ASCE 620 may be connected only to a subset of the outputs of the ASCEs of the previous column 600, this restriction possibly being defined during the design of the reconfigurable computation device, with the aim of minimizing the area of the electronic chip implementing it.

Figure 7:
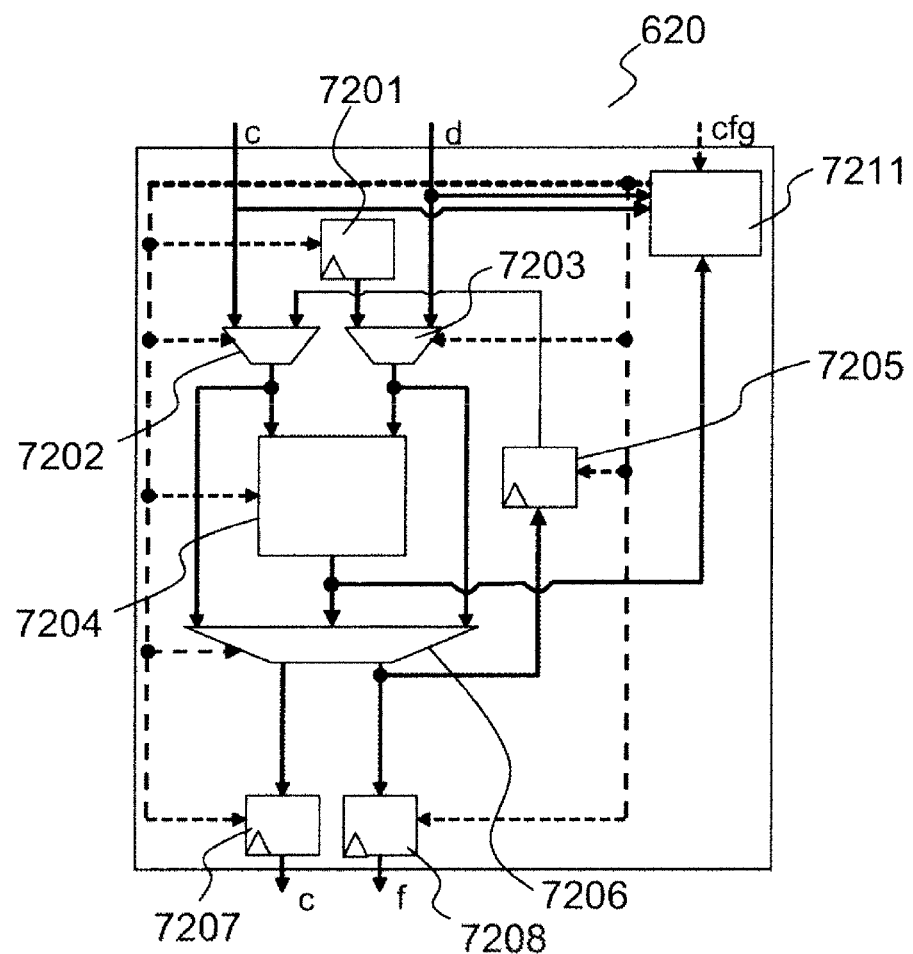
FIG. 7, a diagram illustrating the architecture of a configurable computation module forming a subset of the analysis matrix, in an exemplary embodiment of the invention.

FIG. 7 presents a diagram illustrating the architecture of a configurable computation module ASCE 620 forming a subset of the analysis matrix 13, in an exemplary embodiment of the invention.

An ASCE 620 can comprise a third register 7201, which may be loaded with a constant value specified by a logical word arising from the configuration register 14. Advantageously, the ASCE 620 comprises a configuration logic block 7211, generating the logical configuration words for the elements constituting the ASCE 620, on the basis of the configuration register 14, of the two input values c and d of the ASCE 620 and of the output value of an ASCE computation operator 7204 described in detail hereinafter. The configuration logic block 7211 makes it possible to modify the configuration of certain elements of the ASCE 620 as a function of the input values c and/or d, of the output of the ASCE computation operator 7204 described in detail hereinafter, and of the configuration word contained in the configuration register 14. The ASCE 620 can also comprise a fifth multiplexer 7202 one input of which receives the first input value c of the ASCE 620 and the other input of which receives a value arising from a loopback register 7205 loaded with the result of a computation carried out within the ASCE 620, as described hereinafter. A sixth multiplexer 7203 receives on one of its two inputs, the value contained in the third register 7201, and on the other input, the second input value d of the ASCE 620. The selection of one of the inputs by the fifth and sixth multiplexers 7202, 7203 is specified by a logical word arising from the configuration logic block 7211.

The ASCE 620 furthermore comprises the ASCE computation operator 7204 comprising two inputs, one of which is driven by the output of the fifth multiplexer 7202, and the other by the output of the sixth multiplexer 7203. The ASCE computation operator 7204 can perform an operation specified by a logical word arising from the configuration logic block 7211. The values arising from the fifth and sixth multiplexers 7202, 7203, as well as the output value of the ASCE computation operator 7204, drive the input of a seventh multiplexer 7206 with three inputs and two outputs, the values of which that it must present as output are also specified by a logical word arising from the configuration logic block 7211. The two output values of the seventh multiplexer 7206 load respectively a fourth and a fifth register 7207, 7208, the second output also loading the loopback register 7205. The fourth and fifth registers 7207, 7208 make it possible to validate or to invalidate the result generated by the ASCE 620 for an ongoing clock cycle. This validation is specified by a logical word arising from the configuration logic block 7211 which can depend on the values of the inputs c and d of the ASCE 620, and a logical word arising from the configuration register 14 or else the output of the ASCE computation operator 7204. The fourth and fifth registers 7207, 7208 retrieve the two outputs e and f of the ASCE 620.

The ASCE 620 can for example allow the realization of the following operations, in a nonlimiting manner:
- retrieval at the outputs e and f of the maximum and minimum values of the two inputs c and d,
- retrieval on the first output e of the minimum value of the two inputs c and d, and on the second output f, of the result of the comparison, for example in the form of a Boolean, between the values of the two inputs c and d,
- retrieval on an output of the sum of the two values of the inputs c and d,
- retrieval on the first output e of the difference between the input values c and d, and on the second output f, of the maximum value between the input values c and d,
- retrieval on an output of the product of the two values of the inputs c and d,
- counter function: incrementation of a value, for example if a Boolean input value is set to 1,
- counter function with conditional output: the internal value of the counter is incremented at each cycle, but the value presented as output is updated only if the input value c is set to 1,
- replication of the input values c and d, respectively at the outputs e and f,
- replication of the input values c and d, respectively at the outputs f and e,
- retrieval on the first output e, of the value of the first input c, conditioned to the Boolean value of the second input d, or by default retrieval of a determined constant value on the first output e,
- retrieval of a constant on the second output f, conditioned to the Boolean value of the second input d, or by default retrieval of the value of the first on the second output f.

Two exemplary embodiments of the present invention are now described, based on one and the same hardware architecture, allowing the implementation of two exemplary applications, on the basis of a particular dimensioning of the flexible neighborhood-based reconfigurable computation device. The examples are described with reference to FIGS. 8 to 11.

Of course, the particular dimensioning common to the two exemplary embodiments described is not limiting, and corresponds to a typical dimensioning, while having the aim of favoring the proper understanding of the present invention. This particular dimensioning adopts a neighborhood-based computation matrix 11 of 15 columns 21 comprising 15 neighborhood-based computation elements 200, with reference to FIGS. 1 and 2, that is to say a total of 225 neighborhood-based computation elements 200. The maximum spacing for data displacement within the matrix in all directions is here fixed at 2.

The first level of operators 3205 of the ALU 320 of each neighborhood-based computation element 200 consists, in the example, of the addition, subtraction, multiplication operators and of the CENSUS census operator 3204, as well as of the operator for direct return of the input data. The second level of operators 3206 consists of the absolute value, squaring, square root and identity operators. The third level of operators 3208 consists of the operator for multiplication by a constant specified by a logical word arising from the configuration register 14, and the identity operator.

The flexible reduction tree 12 is composed of a first level of 15 flexible reduction networks, each possessing 15 inputs and 3 outputs. The second level is composed of 3 flexible reduction networks of 15 inputs and 3 outputs. Such an architecture allows the generation of 9 pairing scores per cycle. It makes it possible to generate neighborhoods whose sizes can range from $2 \times 2$ to $11 \times 11$ pixels$^2$, with an overlap of 3 windows by a maximum of 3 pixels horizontally and vertically, and an overlap of 2 windows by a maximum of 7 pixels horizontally and vertically.

The analysis matrix 13 comprises 5 columns each comprising 5 ASCEs 620. The connectivity between the ASCEs is total, and each ASCE comprises an adder, a subtracter and a multiplier. The sign of the output of the operators can control the seventh multiplexer 7206 downstream. This makes it possible, for example, to perform a comparison/swap operation by using the subtracter as a comparator.

In a first exemplary application, the particular dimensioning described hereinabove can allow matching for a disparity computation, and in which the computation of the pairing scores is based on the Census metric, and is performed on a neighborhood of size $15 \times 15$ pixels$^2$, on 2 images $I_1$ and $I_2$, the image $I_1$ forming a reference image. For a neighborhood of the first image $I_1$, the configuration of the analysis matrix 13 makes it possible to extract the disparity that generated the best score, as well as the 4 best scores. This information can then be utilized by a computation unit, for example a processor, with the aim of computing a confidence coefficient for the extracted disparity.

The information relating to the pixels of the neighborhood analyzed in the first image $I_1$ is stored in the first memory 110, with reference to FIG. 1 described previously. The information relating to the pixels of the neighborhood analyzed in the second image $I_2$ is stored in the second memory 111. The information relating to the central pixels of the two images $I_1$ and $I_2$ is stored in the third memory 112.

Figure 8:
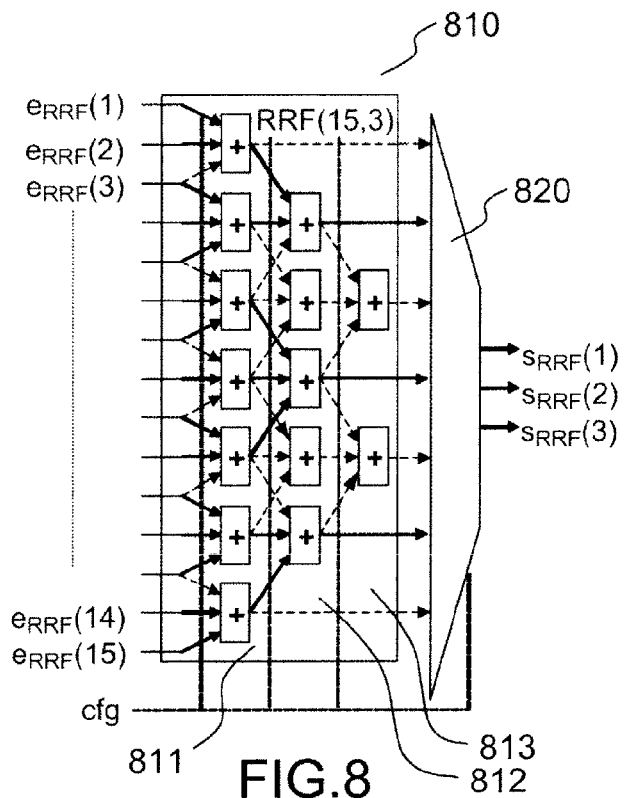
FIG. 8, a diagram illustrating the architecture of a flexible reduction network, in a first exemplary application of a device according to the invention.

The spacing of displacement of the pixels within the neighborhood-based computation matrix is fixed at 1. The neighborhood-based computation elements are configured in such a way that the CENSUS operators of their respective ALU performs a comparison followed by an "exclusive or" and that the value resulting therefrom is chosen as output of the neighborhood-based computation element. FIG. 8 presents a diagram illustrating the architecture of a flexible reduction network, in this first exemplary application. A flexible reduction network 810 comprises three stages of adder blocks with three inputs. The first stage of adders 811 comprises 7 adders, the second stage 812 comprises 5 adders, and the third stage 813 comprises two adders. Subsequently, in a manner similar to the description with reference to FIG. 4 hereinabove, the adders of a given stage are designated in ascending order in the following manner: the first adder of the first stage 811 is driven by the first three inputs $e_{RRF}(1)$ to $e_{RRF}(3)$ of the flexible reduction network 810, the second adder is driven by the third to fifth inputs $e_{RRF}(3)$ to $e_{RRF}(5)$, and so on and so forth, the seventh adder of the first stage 811 being driven by the antepenultimate to the last input $e_{RRF}(13)$ to $e_{RRF}(15)$. The first adder of the second stage 812 is driven by the outputs of the first three adders of the first stage 811, the second adder of the second stage 812 by the outputs of the second, third and fourth adders of the first stage 811, and so on and so forth, the fifth adder of the second stage 812 being driven by the outputs of the last three adders of the first stage 811. The first adder of the third stage 813 is driven by the outputs of the first three adders of the second stage 812, and the second adder of the third stage 813 is driven by the outputs of the last three adders of the second stage 812. Various pathways are deactivated in this first exemplary application: the pathway linking the third input $e_{RRF}(3)$ to the first adder of the first stage 811, the pathway linking the fifth input $e_{RRF}(5)$ to the third adder of the first stage 811, the pathway linking the seventh input $e_{RRF}(7)$ to the fourth adder of the first stage 811, the pathway linking the ninth input $e_{RRF}(3)$ to the fourth adder of the first stage 811, the pathway linking the eleventh input $e_{RRF}(11)$ to the fifth adder of the first stage 811, the pathway linking the thirteenth input $e_{RRF}(13)$ to the last adder of the first stage 811, the pathway linking the output of the second adder of the first stage 811 to the second adder of the second stage 812, the pathway linking the output of the third adder of the first stage 811 to the first adder of the second stage 812, the pathway linking the output of the third adder of the first stage 811 to the second adder of the second stage 812, the pathways linking the output of the fourth adder of the first stage 811, respectively to the second and fourth adders of the second stage 812, the pathway linking the output of the fifth adder of the first stage 811 to the fourth adder of the second stage 812, the pathway linking the output of the fifth adder of the first stage 811 to the fifth adder of the second stage 812, the pathway linking the output of the sixth adder of the first stage 811 to the fourth adder of the second stage 812, all the pathways linked to the inputs and to the outputs of the two adders of the third stage 813. The configuration of the multiplexer 820 connects the output of the first adder of the second stage 812 to the first output $s_{RRF}(1)$, the output of the third adder of the second stage 812 to the second output $s_{RRF}(2)$ and the output of the fifth adder of the second stage 812 to the third output $s_{RRF}(3)$.

Figure 9:
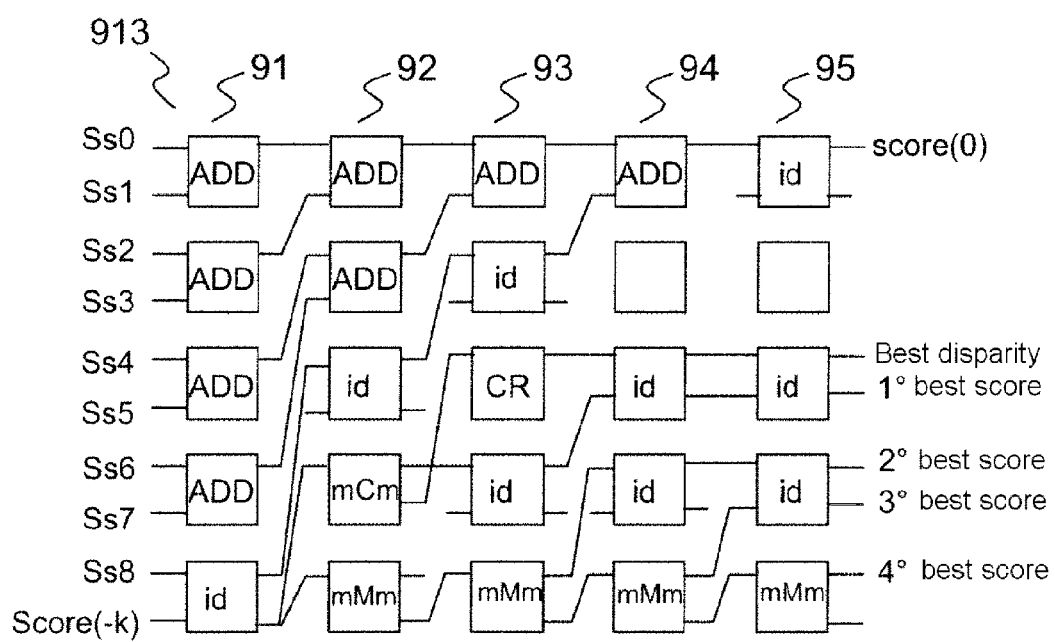
FIG. 9, a diagram illustrating the architecture of the analysis matrix, in the first exemplary application of a device according to the invention.

FIG. 9 presents a diagram illustrating the configuration of the architecture of the analysis matrix, in this first exemplary application. An analysis matrix 913 comprises 5 columns of 5 ASCEs. Subsequently, the sub-scores generated by the flexible reduction tree, respectively on 9 sub-windows of $5 \times 5$ pixels$^2$ without overlap, are denoted ss0 to ss8. In this example, the ASCEs may be configured via the configuration word arising from the configuration register 14 in such a way that the first column 91 comprises four adders, and an identity operator. The first adder of the first column 91 receives as input the data ss0 and ss1, the second adder of the first column 91 the data ss2 and ss3, the third adder of the first column 91 the data ss4 and ss5, the fourth adder of the first column 91 the data ss5 and ss6. The identity operator of the first column 91 receives as input the datum ss9, and a score datum(–k) reinjected from the output of the analysis matrix 913.

The second column 92 comprises:
two adders: the two inputs of the first adder being driven by the outputs of the first two adders of the first column 91, and the two inputs of the second adder being driven by the outputs of the third and fourth adders of the first column 91;
an identity operator, whose first input is driven by the first output of the identity operator of the first column 91;

a fourth operator mCm retrieving on the first output e the minimum value of the two inputs c and d, and on the second output f, the result of the comparison between the two input values c and d, the value of the second input d at a given clock cycle corresponding to the value of the first output e at the previous clock cycle (the loopback of the second output f to the second input d is carried out by way of the loopback register 7205 described previously with reference to FIG. 7), the input of the fourth operator mCm being driven by the second output of the identity operator of the first column 91;

a fifth operator mMm retrieving on the first output the minimum value of the two values from among the first output value e of the previous clock cycle and the first input value c of the current clock cycle and on the second output the maximum value of these two values, the input c being driven by the second output of the identity operator of the first column 91.

The third column 93 comprises:

an adder: the two inputs of the adder being driven by the outputs of the two adders of the second column 92;

a first identity operator whose first input is driven by the first output of the identity operator of the second column 92;

a counter with conditional output, incremented at each cycle and whose value at output is presented conditionally as a function of the Boolean value of the second output of the fourth operator mCm of the second column 92 (if this value is '1', the current value of the counter is set as output, otherwise it is not updated), a second identity operator whose first input is driven by the first output of the fourth operator mCm of the second column 92;

a fifth operator mMm retrieving on the first output the minimum value of the two values from among the first output value e of the previous clock cycle and the first input value c of the current clock cycle, and on the second output the maximum value of these two values, the input c being driven by the second output of the fifth operator mMm of the second column 92.

The fourth column 94 comprises:

an adder: the two inputs of the adder being driven by the respective outputs of the adder of the third column 93 and of the first output of the identity operator of the third column 93;

an identity operator whose first input is driven by the output of the counter of the third column 93, and whose second input is driven by the first output of the second identity operator of the third column 93;

a second identity operator whose first input is driven by the first output of the fifth operator mMm of the third column 93;

a fifth operator mMm retrieving on the first output the minimum value of the two values from among the first output value e of the previous clock cycle and the first input value c of the current clock cycle and on the second output the maximum value of these two values, the input c being driven by the second output of the fifth operator mMm of the third column 93.

The fifth column 95 comprises:

a first identity operator whose first input is driven by the output of the adder of the fourth column 94;

a second identity operator, whose inputs are driven by the outputs of the first identity operator of the fourth column 94;

a third identity operator whose first input is driven by the first output of the second identity operator of the fourth column 94, and whose second input is driven by the first output of the fifth operator mMm of the fourth column 94;

an operator mMm retrieving on the first output the minimum value of the two values from among the first output value e of the previous clock cycle and the first input value c of the current clock cycle and on the second output the maximum value of these two values, the input c being driven by the second output of the fifth operator mMm of the fourth column 94.

In this way, the outputs of the analysis matrix 913 in the first exemplary application are:

the first output of the first identity operator of the fifth column 95, which corresponds to the score score(0) on the neighborhood of 15×15 pixels$^2$ resulting from the sum of the nine sub-scores ss0 to ss8;

the first output of the second identity operator with two inputs and two outputs of the fifth column 95, corresponding to the best current disparity;

the second output of the second identity operator of the fifth column 95, corresponding to the first best pairing score;

the first output of the third identity operator of the fifth column 95, corresponding to the second best pairing score;

the second output of the third identity operator of the fifth column 95, corresponding to the third best pairing score;

the first output of the operator mMm of the fifth column 95, corresponding to the fourth best pairing score.

The datum of the score score(0) on the neighborhood of 15×15 pixels$^2$ is stored in the fourth memory 130, with reference to FIG. 1, and is reinjected into the analysis matrix 13 k clock cycles later.

For a given neighborhood of the reference image $I_1$, the matching with the D neighborhoods of the other image $I_2$ is performed. The processing is performed in several steps:

the first data registers r0 of the neighborhood-based computation elements 200 are filled with the information relating to the pixels of the reference neighborhood and the second data registers r1 are filled with the information relating to the pixels of the first neighborhood to be tested. The column registers $R_{col}$ are filled with the information relating to the central pixel of the reference neighborhood window;

the selection logic block 310 of each neighborhood-based computation element 200 is configured via the configuration register 14, so as to link the first data register r0 to the first input a of the ALU 320, and the column register $R_{col}$ to the second input b of the ALU 320; the CENSUS census operator 3204 is configured to store in its internal register, the CENSUS census register 32042, the value output by the comparison operator 32041 at this cycle, control being performed via the configuration register 14. The output of the second register 3210 is invalidated by way of the configuration register 14;

the column registers $R_{col}$ are filled with the information relating to the central pixel of the first neighborhood window to be analyzed;

the selection logic blocks 310 of the neighborhood-based computation elements 200 are configured via the configuration register 14, so as to link the second data register r1 of the neighborhood-based computation elements 200 with the first input a of the ALU 320, and the column register $R_{col}$ to the second input b of the ALU 320, the CENSUS census operator 3204 switches to computation mode, its internal register 32042 not loading any more data. The output of the second register 3210 is validated by way of the configuration register 14;

the information relating to a column of pixels of the second image $I_2$ is loaded so as to update the pixel neighborhood analyzed. The information relating to the central pixel of the new analyzed pixel neighborhood is then loaded into the column registers $R_{coi}$;

the previous step is repeated until the D next neighborhoods of pixels on the line of the second image $I_2$ have been tested;

the output data of the analysis matrix 13 can then be utilized, and the aforementioned steps rerun with the next reference neighborhood.

In a second exemplary application, the particular dimensioning described hereinabove can allow matching for a disparity computation, in which matching the computation of the pairing scores is based on the SAD metric, and is performed on a neighborhood of five windows of size 5×5 pixels² with an overlap of two pixels vertically and horizontally, on 2 images $I_1$ and $I_2$, the image $I_1$ forming a reference image. For a neighborhood of the first image $I_1$, the configuration of the analysis matrix 13 makes it possible to extract the disparity that generated the best score by taking this neighborhood as reference, this disparity being designated "vertical disparity" subsequently, as well as this best score, designated "best vertical score" subsequently. This configuration also makes it possible to extract the best disparity by taking the second image $I_2$ as reference, this disparity being designated "diagonal disparity" subsequently, the corresponding score being designated "best diagonal score" subsequently. This information can then be utilized by a computation unit, for example a processor, with the aim of performing a verification of the symmetry. It is possible to refer to the publication by Fusiello A., Roberto V., Trucco E., "Symmetric stereo with multiple windowing", Int. J. Pattern Recognition and Artificial Intelligence, vol. 14, p. 1053-1066, 2000, for more details about the metric forming the subject of this second exemplary application.

The information relating to the pixels of the neighborhood analyzed in the first image $I_1$ are stored in the first memory 110, with reference to FIG. 1 described previously. The information relating to the pixels of the neighborhood analyzed in the second image $I_2$ are stored in the second memory 111.

The spacing of displacement of the pixels within the neighborhood-based computation matrix is fixed at 1. The neighborhood-based computation elements 200 are configured so as to effect an absolute difference between their two inputs a and b.

Figure 10:
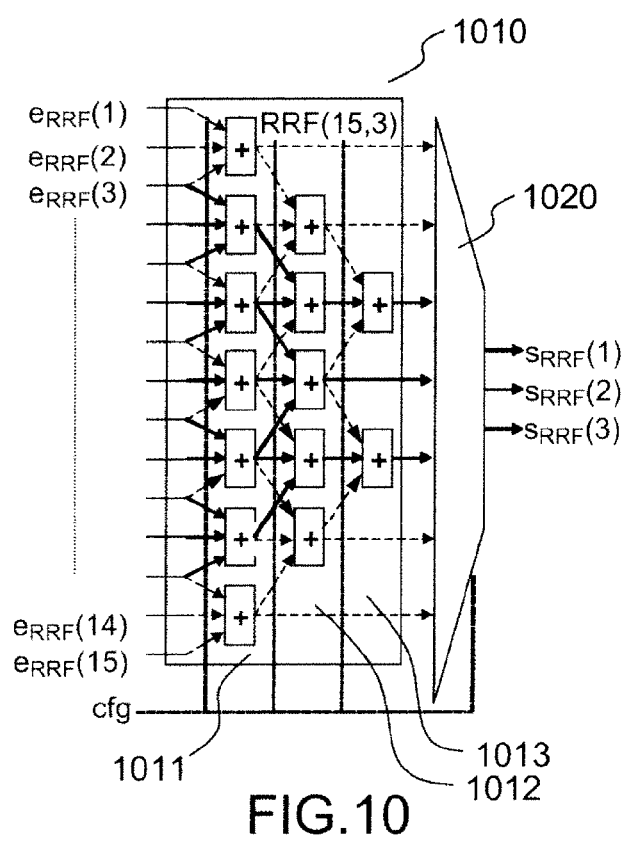
FIG. 10, a diagram illustrating the architecture of a flexible reduction network, in a second exemplary application of a device according to the invention.

FIG. 10 presents a diagram illustrating the architecture of a flexible reduction network, in this second exemplary application. A flexible reduction network 1010 comprises three stages of adder blocks with three inputs. The first stage of adders 1011 comprises 7 adders, the second stage 1012 comprises 5 adders, and the third stage 1013 comprises two adders. The first adder of the first stage 1011 is driven by the first three inputs $e_{RRF}(1)$ to $e_{RRF}(3)$ of the flexible reduction network 1010, the second adder is driven by the third to fifth inputs $e_{RRF}(3)$ to $e_{RRF}(5)$, and so on and so forth, the seventh adder of the first stage 1011 being driven by the antepenultimate to the last input $e_{RRF}(13)$ to $e_{RRF}(15)$. The first adder of the second stage 1012 is driven by the outputs of the first three adders of the first stage 1011, the second adder of the second stage 1012 by the outputs of the second, third and fourth adders of the first stage 1011, and so on and so forth, the fifth adder of the second stage 1012 being driven by the outputs of the last three adders of the first stage 1011. The first adder of the third stage 1013 is driven by the outputs of the first three adders of the second stage 1012, and the second adder of the third stage 1013 is driven by the outputs of the last three adders of the second stage 1012. Various pathways are deactivated in this second exemplary application: all the pathways linked to the inputs of the first and ultimate adders of the first stage 1011, the pathway linking the fifth input $e_{RRF}(5)$ to the third adder of the first stage 1011, the pathways linking the seventh input $e_{RRF}(7)$ and the ninth input $e_{RRF}(9)$ to the fourth adder of the first stage 1011, the pathway linking the eleventh input $e_{RRF}(11)$ to the fifth adder of the first stage 1011, all the pathways linked to the inputs of the first and ultimate adders of the second stage 1012, the pathway linking the output of the fourth adder of the first stage 1011 to the second adder of the second stage 1012, the pathway linking the output of the fourth adder of the first stage 1011 to the fourth adder of the second stage 1012, the pathway linking the output of the first adder of the second stage 1012 to the first adder of the third stage 1013, the pathway linking the output of the third adder of the second stage 1012 to the first adder of the third stage 1013, the pathway linking the output of the third adder of the second stage 1012 to the second adder of the third stage 1013, the pathway linking the output of the fifth adder of the second stage 1012 to the second adder of the third stage 1013. The configuration of the multiplexer 1020 connects the output of the first adder of the third stage 1013 to the first output $s_{RRF}(1)$, the output of the third adder of the second stage 1012 to the second output $s_{RRF}(2)$ and the output of the second adder of the third stage 1013 to the third output $s_{RRF}(3)$.

Figure 11:
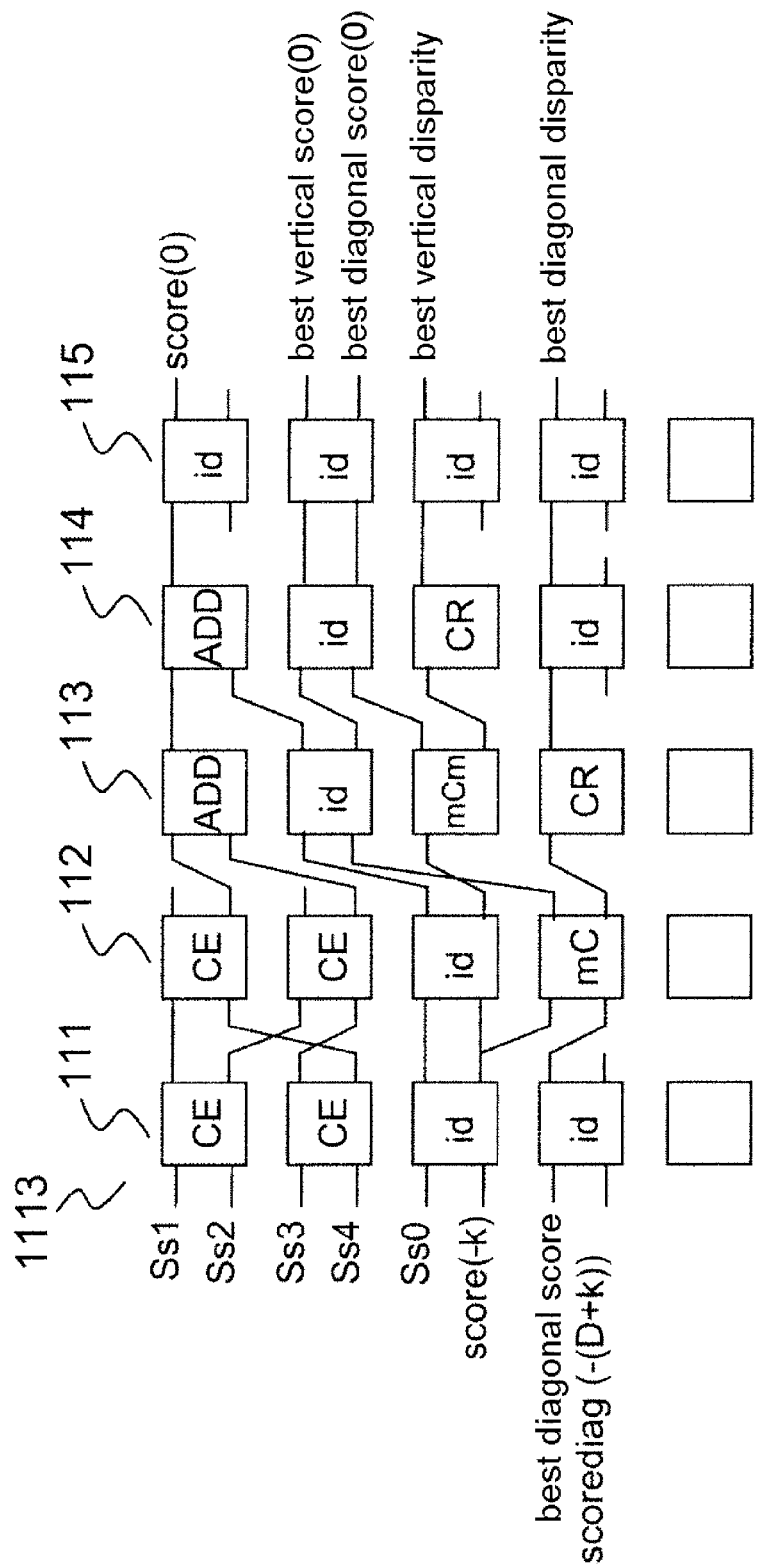
FIG. 11, a diagram illustrating the architecture of the analysis matrix, in the second exemplary application of a device according to the invention.

FIG. 11 presents a diagram illustrating the configuration of the architecture of the analysis matrix 13, in this second exemplary application. An analysis matrix 1113 comprises 5 columns of 5 ASCEs 620. Subsequently, the sub-scores generated by the flexible reduction tree 12 are respectively the sub-score of the central window ss0 and the sub-scores ss1 to ss4 of the 4 peripheral windows. In this example, the first column 111 comprises:

a first and a second operator CE whose outputs e and f retrieve respectively the maximum value of the two input values c and d, and the minimum value of the two input values c and d, the inputs c and d of the first operator being driven by the first two sub-scores ss1 and ss2, and the inputs c and d of the second operator being driven by the third and fourth sub-scores ss3 and ss4;

a first identity operator whose first input is driven by the value of the sub-score of the central window ss0, and whose second input is driven by a score score(−k) reinjected from an output of the analysis matrix 1113;

a second identity operator whose first input is driven by a diagonal disparity score scorediag(−(D+k)) reinjected from an output of the analysis matrix 1113.

The second column 112 comprises:

a first and a second operator CE whose outputs e and f retrieve respectively the maximum value of the two input values c and d, and the minimum value of the two input values c and d, the first input c of the first operator CE being driven by the first output of the first operator CE of the first column 111, the second input d of the first operator CE being driven by the second output f of the second operator CE of the first column 111, the first input c of the second operator CE being driven by the second output f of the first operator CE of the first column 111, and the second input d of the second operator CE being driven by the first output e of the second operator CE of the first column 111;

an identity operator whose two inputs are driven by the two outputs of the first identity operator of the first column 111;

an operator mC whose first output e retrieves the minimum value of the two inputs c and d, and whose second output f retrieves a Boolean value resulting from the comparison of the two input values c and d, the first input being driven by the second output of the first identity operator of the first column 111, and the second input being driven by the first output of the second identity operator of the first column 111.

The third column 113 comprises:

an adder, the two inputs of the adder being driven by the respective second outputs of the two first operators CE of the second column 112;

an identity operator whose first input c is driven by the first output e of the identity operator of the second column 112, and whose second input is driven by the first output of the operator mC of the second column 112;

an operator mCm retrieving on the first output e the minimum value of the two inputs c and d, and on the second output f, the result of the comparison between the two input values c and d, the value of the second input d at a given clock cycle corresponding to the value of the first output e at the previous clock cycle (the loopback of the second output f to the second input d is carried out by way of the loopback register 7205 described previously with reference to FIG. 7), the input of the operator mCm being driven by the second output of the identity operator of the second column 112;

a counter, incremented at each cycle and whose value at output is presented conditionally as a function of the Boolean value of the second output of the operator mC of the second column 112 (if this value is '1', the current value of the counter is set as output, otherwise it is not updated);

The fourth column 114 comprises:

an adder: the two inputs of the adder being driven by the respective first outputs of the adder of the third column 113 and of the identity operator of the third column 113;

a first identity operator whose first input is driven by the second output of the identity operator of the third column 113, and whose second input is driven by the first output of the operator mC of the third column 113;

a counter, incremented at each cycle and whose value at output is presented conditionally as a function of the Boolean value of the second output of the operator mCm of the third column 113 (if this value is '1', the current value of the counter is set as output, otherwise it is not updated);

a second identity operator whose first input is driven by the output of the counter of the third column 113.

The fifth column 115 comprises:

a first identity operator, whose first input is driven by the output of the adder of the fourth column 114;

a second identity operator, whose inputs are driven by the outputs of the first identity operator of the fourth column 114;

a third identity operator, whose first input is driven by the output of the counter of the fourth column 114;

a fourth identity operator, whose first input is driven by the first output of the second identity operator of the fourth column 114.

In this way, the outputs of the analysis matrix 1113 in the second exemplary application are:

the first output of the first identity operator of the fifth column 115, which corresponds to the score score(0), the sum of the central score and of the two lowest peripheral scores;

the first output of the second identity operator of the fifth column 115, corresponding to the best vertical score, that is to say the best score with the neighborhood of the image $I_1$ as reference;

the second output of the second identity operator of the fifth column 115, corresponding to the best diagonal score, that is to say the best score with the neighborhood of the image $I_2$ as reference;

the first output of the third identity operator of the fifth column 115, corresponding to the best vertical disparity;

the first output of the fourth identity operator of the fifth column 115, corresponding to the best diagonal disparity.

The datum of the score score(0) is stored in the fourth memory 130, with reference to FIG. 1, and is reinjected into the analysis matrix 13 k clock cycles later. The datum of the diagonal score best score(0) is stored in the fourth memory 130, with reference to FIG. 1, and is reinjected into the analysis matrix 13 D+k clock cycles later (D being the maximum disparity number). This score, as well as the best current diagonal score, are read from memory, and allow the computation of the best current disparity, of the best current diagonal disparity, of the best current score and of the best current diagonal score. These data are stored at each cycle in the fourth memory 130.

For a given neighborhood of the reference image $I_1$, the matching with the D neighborhoods of the other image $I_2$ is performed. The processing is performed in several steps:

the selection logic block 310 of each neighborhood-based computation element 200 is configured via the configuration register 14, so as to link the first data register r0 to the first input a of the ALU 320, and the second data register r1 to the second input b of the ALU 320. The output of the second register 3210 is invalidated by way of the configuration register 14;

the first data registers r0 are filled with the information relating to the pixels of the reference neighborhood and the second registers r1 are filled with the information relating to the pixels of the first neighborhood to be tested;

the output of the second register 3210 is validated by way of the configuration register 14;

a column of pixels of the second image $I_2$ is loaded into the registers r1 of the elements of the first column of the neighborhood-based computation matrix, originating from the second memory 111, so as to update the analyzed neighborhood. The data contained in the registers r1 of a column are transferred to the registers r1 of its immediate neighbor (spacing of 1);

the previous step is repeated until the D next neighborhoods of pixels on the line of the second image $I_2$ have been tested;

the output data of the analysis matrix 13 can then be utilized, and the aforementioned steps rerun with the next reference neighborhood.

For example, a reconfigurable computation device capable of generating four pairing scores per clock cycle, at a frequency of 200 MHz on neighborhoods of 15×15 pixels$^2$ can for example be implemented on an electronic chip etched on silicon. The device can allow the computation of the disparity of a pair of images to the VGA standard—according to the initials corresponding to the expression "Video Graphics Array", that is to say with a resolution of 640×480 pixels$^2$—, with a rate of 40 images per second, for 64 disparity levels, this corresponding to a processing performance of the order of 0.8 Gigapixels of disparity per second or 0.8 GPDS. The practical embodiment of an exemplary device such as this, with a fineness of etching of 65 nm in low-consumption technology, occupies an area of the order of 3 mm$^2$.

It should be noted that the computation device according to the present invention may be adapted according to requirements, and may be dimensioned as a function of the target applications. For example, several matrices may be placed in parallel within one and the same hardware structure. Also, pairing computations on bigger neighborhoods may be carried out by increasing the size of the matrices. In the same manner, the use of memories of larger capacities makes it possible to process pairs of images of bigger resolutions.

Conversely, the use of a reduced number of matrices, or else of matrices of smaller dimensions, may be envisaged for low-consumption applications.

The invention claimed is:

1. A reconfigurable computation device for image processing, the device comprising:
   at least one neighborhood-based computation matrix generating pairing sub-scores between pairs of pixels resulting from a first series of operations configurable via data contained in a configuration register;
   at least one flexible reduction tree carrying out on the pairing sub-scores a second series of operations configurable via the configuration register on neighborhoods of pixels configurable via the configuration register; and
   at least one analysis matrix carrying out computations of scores configurable via the configuration register on the results arising from the flexible reduction tree,
   wherein the analysis matrix comprises a plurality L of columns, each column comprising a plurality W of configurable computation modules with two inputs and two outputs able to carry out arithmetical or combinatorial operations specified via the configuration register, the inputs of the configurable computation modules of the first column being driven by the outputs of the flexible reduction tree after redirection via a flexible interconnection network disposed upstream of the first column, the redirection being specified via the configuration register, and the results arising from the operations carried out by the configurable computation modules of a given column being applied to the inputs of the configurable computation modules of the next column, after redirection via a flexible interconnection network disposed upstream of the first column, the redirection being specified via the configuration register.

2. The reconfigurable computation device according to claim 1, wherein the neighborhood-based computation matrix communicates with at least two memories, a first memory containing information relating to pixels of a first image and a second memory containing information relating to pixels of a second image.

3. The reconfigurable computation device according to claim 2, further comprising a third memory able to store information common to a plurality of pixels of one of the images and communicating with the neighborhood-based computation matrix.

4. The reconfigurable computation device according to claim 2, wherein the neighborhood-based computation matrix comprises a plurality M of columns, each column comprising a plurality N of neighborhood-based computation elements each neighborhood-based computation element performing on information relating to a pair of pixels arising from the two respective images, operations configurable via the configuration register producing a pairing sub-score.

5. The reconfigurable computation device according to claim 4, wherein each neighborhood-based computation element comprises two data registers storing intermediate data undergoing processing.

6. The reconfigurable computation device according to claim 4, wherein each neighborhood-based computation element comprises an arithmetic and logic unit with two inputs determined by a selection logic block selecting via the configuration register two data from among the data contained in the two data registers, a value resulting from the computations effected at a previous clock cycle by the neighborhood-based computation element of like rank of the following column, and the value resulting from the computations effected at the previous clock cycle by the neighborhood-based computation element of like rank of the previous column.

7. The reconfigurable computation device according to claim 6, wherein at each clock cycle, the data included in the first data register and the second data register of a neighborhood-based computation element of a given column, can move respectively into the first data register and the second data register of the neighborhood-based computation element of the same given rank, into a column preceding or following the said given column by a first integer spacing configurable via the configuration register of a determined maximum value, or into the first data register and the second data register of the neighborhood-based computation element of higher or lower rank than the said given rank by a second integer spacing configurable via the configuration register of a determined maximum value.

8. The reconfigurable computation device according to claim 7, wherein each column is associated with a column register containing data common to all the neighborhood-based computation elements of the column.

9. The reconfigurable computation device according to claim 8, wherein the selection logic block is furthermore able to select the data included in the column register.

10. The reconfigurable computation device according to claim 9, wherein the arithmetic and logic unit comprises at least one first level of arithmetic operators with two inputs and an output, a second level of operators with an input and an output and a third level of operators with an input and an output, the data applied to the inputs of the operators included in the second and third levels being selected by multiplexers from among the outputs respectively of the operators of the first level and second level via the configuration register the data applied to the two inputs of the operators of the said first level being the two input data of the logic and arithmetic unit.

11. The reconfigurable computation device according to claim 10, wherein each of the arithmetic operators of the said first level of operators is a multiplier, an adder, a subtracter or a divider.

12. The reconfigurable computation device according to claim 10, wherein each of the arithmetic operators of the said first level of operators is a multiplier, an adder, a subtracter, a divider or a census operator comprising a comparison operator comparing the two inputs of the operator, whose Boolean output drives a census register, the census register and the output of the comparison operator driving the inputs of a census logical computation operator, the configurations of the census register, of the comparison operator and of the census logical computation operator being specified by a configuration word contained in the configuration register.

13. The reconfigurable computation device according to claim 10, wherein the arithmetic and logic unit furthermore comprises a first register able to store the value of a first input at a given clock cycle, a first multiplexer allowing the selection of the first input or of the value stored in the first register so as to drive an input of each of the arithmetic operators of the said first level of operators.

14. The reconfigurable computation device according to claim 6, characterized in that wherein the arithmetic and logic unit furthermore comprises a second register at the output of the neighborhood-based computation element able to validate or invalidate the result obtained at a given clock cycle, as a function of a configuration bit present in the configuration register.

15. The reconfigurable computation device according to claim 1, further comprising a fourth memory is able to store intermediate data utilized by the analysis matrix.

16. The reconfigurable computation device according to claim 1, wherein output data of the analysis matrix are able to be communicated to an external device via a data bus.

17. The reconfigurable computation device according to claim 1, wherein output data of the analysis matrix are able to be reintroduced as input to the analysis matrix.

18. The reconfigurable computation device according to claim 1, wherein the flexible reduction tree comprises a first stage of flexible reduction networks and a second stage of flexible reduction networks, the first stage comprising M flexible reduction networks with N inputs and a number K of outputs and the second stage comprising K flexible reduction networks with M inputs and a number F of outputs, K corresponding to the maximum number of simultaneous windows on a column and F to the maximum number of simultaneous windows on a line.

19. The reconfigurable computation device according to claim 18, wherein each flexible reduction network comprises a plurality of stages of adder blocks, the inputs of the adder blocks of the first stage being the inputs of the flexible reduction network and the inputs of the adder blocks of a next stage being driven by the outputs of the adder blocks of the previous stage.

20. The reconfigurable computation device according to claim 19, wherein the number of stages of adder blocks is equal to three, and each adder block possesses three inputs.

21. The reconfigurable computation device according to claim 18, wherein inputs of the adder blocks may be disabled, a selection of the disabled inputs being carried out via the configuration register.

22. The reconfigurable computation device according to claim 1, wherein each configurable computation module comprises at least one computation operator with two inputs and an output, configurable via the configuration register a third register storing a determined value specified via the configuration register a loopback register able to reinject a result arising from the computation operator at one of its inputs, a fourth register and a fifth register which are able to validate or invalidate the results generated by the configurable computation module as a function of the input values output values of the computation operator or of the configuration register.

23. The reconfigurable computation device according to claim 22, characterized in that wherein the computation operator receives at its first input a value chosen by a fifth multiplexer via the configuration register between the first input value of the configurable computation module and the value stored in the loopback register, and at its second input a value chosen by a sixth multiplexer via the configuration register between the second input value of the configurable computation module and the value stored in the third register.

24. The reconfigurable computation device according to claim 23, wherein a seventh multiplexer allows a selection of the inputs of the fourth and fifth registers via the configuration register from among the output of the said fifth multiplexer, of the said sixth multiplexer and of the output of the said computation operator.

25. The reconfigurable computation device according to claim 22, wherein each configurable computation module furthermore comprises a configuration logic block generating in place of the configuration register the logical configuration words for elements constituting the configurable computation module on the basis of the configuration register of the two input values of the configurable computation module and of an output value of the computation operator.

26. An integrated circuit implementing a reconfigurable computation device according to claim 1.

27. An integrated circuit implementing a plurality of reconfigurable computation devices according to claim 1, mounted in parallel.

* * * * *